United States Patent
Yu et al.

(10) Patent No.: US 8,660,349 B2
(45) Date of Patent: Feb. 25, 2014

(54) SCREEN AREA DETECTION METHOD AND SCREEN AREA DETECTION SYSTEM

(75) Inventors: Hailong Yu, Beijing (CN); Donglai Li, Beijing (CN); Wenbo Zhang, Beijing (CN); Pingping Pan, Beijing (CN); Weitao Gong, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 413 days.

(21) Appl. No.: 13/086,960

(22) Filed: Apr. 14, 2011

(65) Prior Publication Data
US 2011/0274353 A1    Nov. 10, 2011

(30) Foreign Application Priority Data

May 7, 2010  (CN) .......................... 2010 1 0165224

(51) Int. Cl.
*G06K 9/34*       (2006.01)
(52) U.S. Cl.
USPC ....................................... 382/173; 348/222.1
(58) Field of Classification Search
USPC ......................................................... 382/173
See application file for complete search history.

(56) References Cited

U.S. PATENT DOCUMENTS

| | | | | |
|---|---|---|---|---|
| 6,618,076 | B1 * | 9/2003 | Sukthankar et al. | 348/180 |
| 6,753,907 | B1 * | 6/2004 | Sukthankar et al. | 348/222.1 |
| 7,643,701 | B2 * | 1/2010 | Sakurai | 382/282 |
| 7,813,553 | B2 * | 10/2010 | Suzuki et al. | 382/190 |
| 8,120,665 | B2 * | 2/2012 | Maruyama et al. | 348/222.1 |
| 8,295,599 | B2 * | 10/2012 | Katougi et al. | 382/173 |
| 8,393,740 | B2 * | 3/2013 | Sajadi et al. | 353/70 |
| 2004/0165786 | A1 * | 8/2004 | Zhang et al. | 382/276 |
| 2008/0266253 | A1 * | 10/2008 | Seeman et al. | 345/158 |
| 2011/0274353 | A1 * | 11/2011 | Yu et al. | 382/173 |

* cited by examiner

*Primary Examiner* — Gandhi Thirugnanam
(74) *Attorney, Agent, or Firm* — Dickstein Shapiro LLP

(57) ABSTRACT

A screen area capturing an image including the screen area; obtaining candidate boundaries of the screen area; converting the candidate boundaries into straight lines; carrying out binary image processing with regard to the captured image; obtaining boundary pixels of a maximum target area, and letting the boundary pixels serve as an outline of the maximum target area; selecting straight lines on the outline from the converted straight lines; dividing the selected straight lines into four classes; and obtaining final straight lines by carrying out straight line fitting with regard to straight lines in the respective classes so as to obtain four boundaries of the screen area.

10 Claims, 6 Drawing Sheets

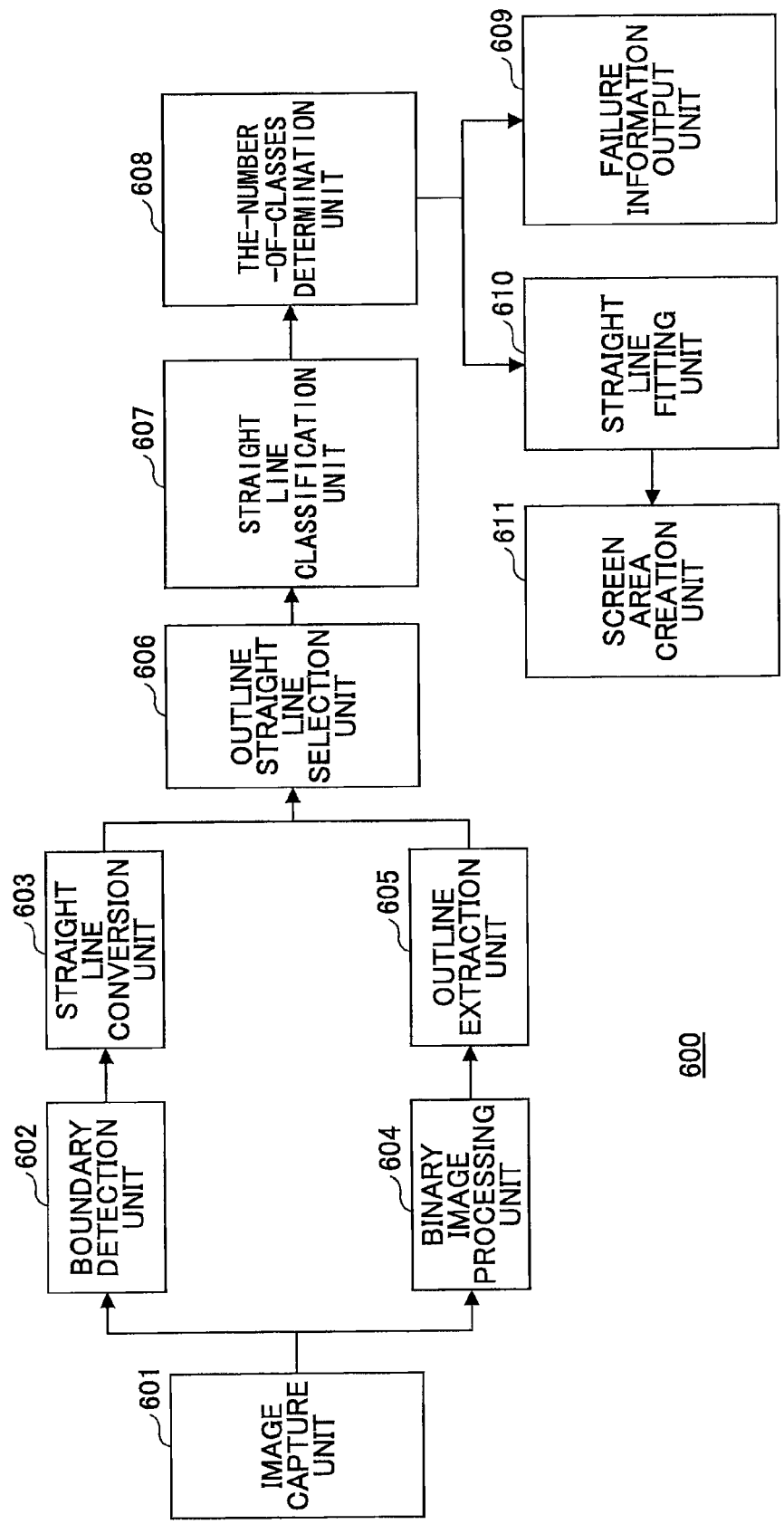

SCREEN AREA DETECTION METHOD AND SCREEN AREA DETECTION SYSTEM

BACKGROUND OF THE INVENTION

1. Field of the Invention

The present invention relates to the field of image processing, particularly relates to the field of image division, and more particularly related to a method of detecting a screen area in a captured image as well as a system using the method.

2. Description of the Related Art

In various meetings, it is very helpful to use a projector as an assistant tool for a presentation. However, during the presentation, a presenter needs to frequently operate a computer to switch contents needing to be projected on a screen, or needs to let an assistant switch the contents projected on the screen by operating a computer connected to the projector according to presentation speed of the presenter. This kind of method of using the projector brings ultra-convenience to the presenter, but its operation still costs time or work.

As a result, a method able to operate a computer by directly clicking contents on a screen has been proposed; that is, an image including a screen area is captured by an image capture device, then positional information of the screen area in the captured image is extracted by the computer, and then the contents needing to be projected on the screen are switched by utilizing the positional information of the screen area and operations carried out with regard to the contents on the screen.

In order to extract a specific area from a captured image, US Patent Application Publication NO. 2004/0165786A discloses a method and a device for extracting whiteboard contents in an image and converting the extracted whiteboard contents into an electronic document. In order to be able to automatically recognize a whiteboard area in the captured image, this patent application adopts a rectangle detection algorithm for recognizing the whiteboard area. However, according to the method described in the patent application, plural parallel straight lines are usually detected when carrying out whiteboard side detection; as a result, it is very difficult to accurately determine which one of the straight lines is the whiteboard side. This results in a big error between the detected whiteboard and the actual whiteboard.

Furthermore US Patent Application Publication NO. 2008/0266253A discloses a system by which light spots projected on a screen area by a computer are tracked. In the system described in this patent application, a screen area detection method is adopted. This method captures an image by using an image capture device, then carries out binary processing with regard to the captured image, and then sorts out a rectangle from the processed image so as to obtain the screen area. However, this method depends on the quality of the captured image very much; as a result, in order to improve the quality of the captured image, it is necessary to add a special filter for the image capture device.

Furthermore, in U.S. Pat. No. 6,618,076, a device used in a calibration projector-camera system is disclosed. The technical proposal described in this patent carries out feature extraction by letting a projector project a special pattern on a screen.

Therefore a method and a device, by which a screen area may be detected more accurately in a case where hardware is not added so that a presenter is able to switch contents more accurately when operating a projecting system, are desirable.

SUMMARY OF THE INVENTION

In order to solve the above described problems in the conventional techniques, in the present invention, a method, of accurately obtaining whiteboard sides in a system adopting a computer-human interaction virtual whiteboard so as to obtain an accurate coordinate position of a pointing spot projected on a screen with regard to the screen, is provided so that it is possible to output the accurate coordinate position of the pointing spot with regard to the screen to the system adopting the computer-human interaction virtual whiteboard so as to able to use the pointing spot to carry out interactions with a computer.

In addition, in order to accurately detect the coordinate position of the pointing spot (for example, a laser spot) in a captured image, the brightness of the captured image needs to be very low. As a result, it is difficult to carry out screen area detection in the captured image by using conventional techniques; in other words, it is difficult to use, for example, a general-purpose corner point detection algorithm to obtain an accurate result. Consequently a screen area detection method and a screen area detection system by which this kind of disadvantage can be overcome are provided in the present invention.

According to one aspect of the present invention, a screen area detection method is provided. The screen area detection method comprises a step of capturing an image including a screen area; a step of obtaining plural candidate boundaries of the screen area based on variation of brightness values of respective pixels in the captured image; a step of converting the obtained candidate boundaries into straight lines by using Hough transform; a step of carrying out binary processing with regard to the captured image, wherein, the captured image is divided into one or more target areas and one or more non-target areas; a step of obtaining boundary pixels of a maximum target area in the target areas, and letting the boundary pixels serve as an outline of the maximum target area; a step of selecting straight lines on the outline from the converted straight lines based on minimum distances between the boundary pixels and the respective converted straight lines as well as directions of the respective converted straight lines; a step of dividing the selected straight lines into an upper boundary straight line class, a bottom boundary straight line class, a left boundary straight line class, and a right boundary straight line class based on positional relationships of the selected straight lines; and a step of obtaining final straight lines by carrying out straight line fitting with regard to plural straight lines in the respective classes so as to obtain four boundaries of the screen area.

Furthermore, according to an embodiment of the present invention, in the screen area detection method, the candidate boundaries of the screen area are obtained by using a Canny, Sobel, or Harris edge detection algorithm.

Furthermore, according to an embodiment of the present invention, in the screen area detection method, the step of selecting the straight lines on the outline from the converted straight lines includes a step of calculating distances between the respective boundary pixels and a corresponding converted straight line, and selecting a minimum value from the calculated distances to serve as a minimum distance between the corresponding converted straight line and the outline; and a step of comparing the obtained minimum distance and a predetermined distance threshold value, and letting the corresponding converted straight line be one of the straight lines on the outline if the minimum distance is less than the predetermined distance threshold value.

Furthermore, according to an embodiment of the present invention, in the screen area detection method, the step of selecting the straight lines on the outline from the converted straight lines further includes a step of calculating a direction of a corresponding converted straight line based on lateral brightness gradients and longitudinal brightness gradients of respective pixels on the corresponding converted straight line; a step of calculating a boundary pixel closest to the corresponding converted straight line, and calculating a direction of the boundary pixel based on a lateral brightness gradient and a longitudinal brightness gradient of the boundary pixel; and a step of comparing the direction of the corresponding converted straight line and the direction of the boundary pixel, and letting the corresponding converted straight line be one of the straight lines on the outline if an angle between the two directions is less than a predetermined angle threshold value.

Furthermore, according to an embodiment of the present invention, in the screen area detection method, the predetermined distance threshold value is a distance of 5, 6, 7, 8, 9, or 10 pixels.

Furthermore, according to an embodiment of the present invention, in the screen area detection method, the predetermined angle threshold value is 20, 30, 40, or 45 degrees.

According to another aspect of the present invention, a screen area detection system is provided. The screen area detection system comprises an image capture unit used to capture an image including a screen area; a boundary detection unit used to obtain plural candidate boundaries of the screen area based on variation of respective pixels in the captured image; a straight line conversion unit used to convert the obtained candidate boundaries into straight lines by using Hough transform; a binary image processing unit used to carry out binary image processing with regard to the captured image, wherein, the capture image is divided into one or more target areas and one or more non-target areas; an outline extraction unit used to extract plural boundary pixels of a maximum target area, and let the boundary pixels serve as an outline of the maximum target area; a straight line selection unit used to select straight lines located on the outline from the converted straight lines based on minimum distances between the boundary pixels and the respective converted straight lines as well as directions of the respective converted straight lines; a straight line classification unit used to divide the selected straight lines located on the outline into an upper boundary straight line class, a bottom boundary straight line class, a left boundary straight line class, and a right boundary straight line class based on positional relationships of the selected straight lines; and a straight line fitting unit used to obtain final straight lines by carrying out straight line fitting with regard to plural straight lines in the respective classes so as to obtain four boundaries of the screen area.

As a result, by obtaining the four boundaries of the screen area, it is possible to output coordinates of respective corner points of the screen area.

Furthermore, according to an embodiment of the present invention, in the screen area detection system, the candidate boundaries of the screen area are obtained by using a Canny, Sobel, or Harris edge detection algorithm.

Furthermore, according to an embodiment of the present invention, in the screen area detection system, the straight line selection unit includes a distance calculation unit used to calculate distances between the respective boundary pixels and a corresponding converted straight line, and select a minimum value from the calculated distances to serve as a minimum distance between the corresponding converted straight line and the outline; and a distance comparison unit used to compare the obtained minimum distance and a predetermined distance threshold value, and let the corresponding converted straight line be one of the straight lines located on the outline if the minimum distance is less than the predetermined distance threshold value.

Furthermore, according to an embodiment of the present invention, in the screen area detection system, the straight line selection unit further includes a direction calculation unit used to calculate a direction of a corresponding converted straight line based on lateral brightness gradients and longitudinal brightness gradients of respective pixels on the corresponding converted straight line, and by calculating a boundary pixel closest to the corresponding converted straight line, calculate a direction of the boundary pixel based on a lateral brightness gradient and a longitudinal brightness gradient of the boundary pixel; and a comparison unit used to compare the direction of the corresponding converted straight line and the direction of the boundary pixel, and let the corresponding converted straight line be one of the straight lines located on the outline if an angle between the two directions is less than a predetermined angle threshold value.

According to the embodiments of the present invention, by using the above described screen area detection method to obtain the accurate coordinates of the respective corner points with regard to the detected screen area, it is possible to convert coordinates of a pointing spot with regard to the captured image into coordinates of the pointing spot with regard to the detected screen area. In general, the accuracy of the converted coordinates of the pointing spot with regard to the detected screen area depends very much on the accuracy of the screen area detection. Since the accurate coordinates of the respective corner points with regard to the detected screen area can be obtained according to the embodiments of the present invention, it is possible to obtain a high-accuracy position of the pointing spot in the detected screen area.

BRIEF DESCRIPTION OF THE DRAWINGS

FIG. 6 is a block diagram of a screen area detection system.

DETAILED DESCRIPTION OF THE PREFERRED EMBODIMENTS

Hereinafter, various embodiments of the present invention will be concretely described with reference to the drawings. Here it should be noted that the same symbols, which are in the specification and the drawings, stand for constructional elements having the same or basically-same function and structure, and repeated explanations for the constructional elements are omitted in the specification.

Figure 1:
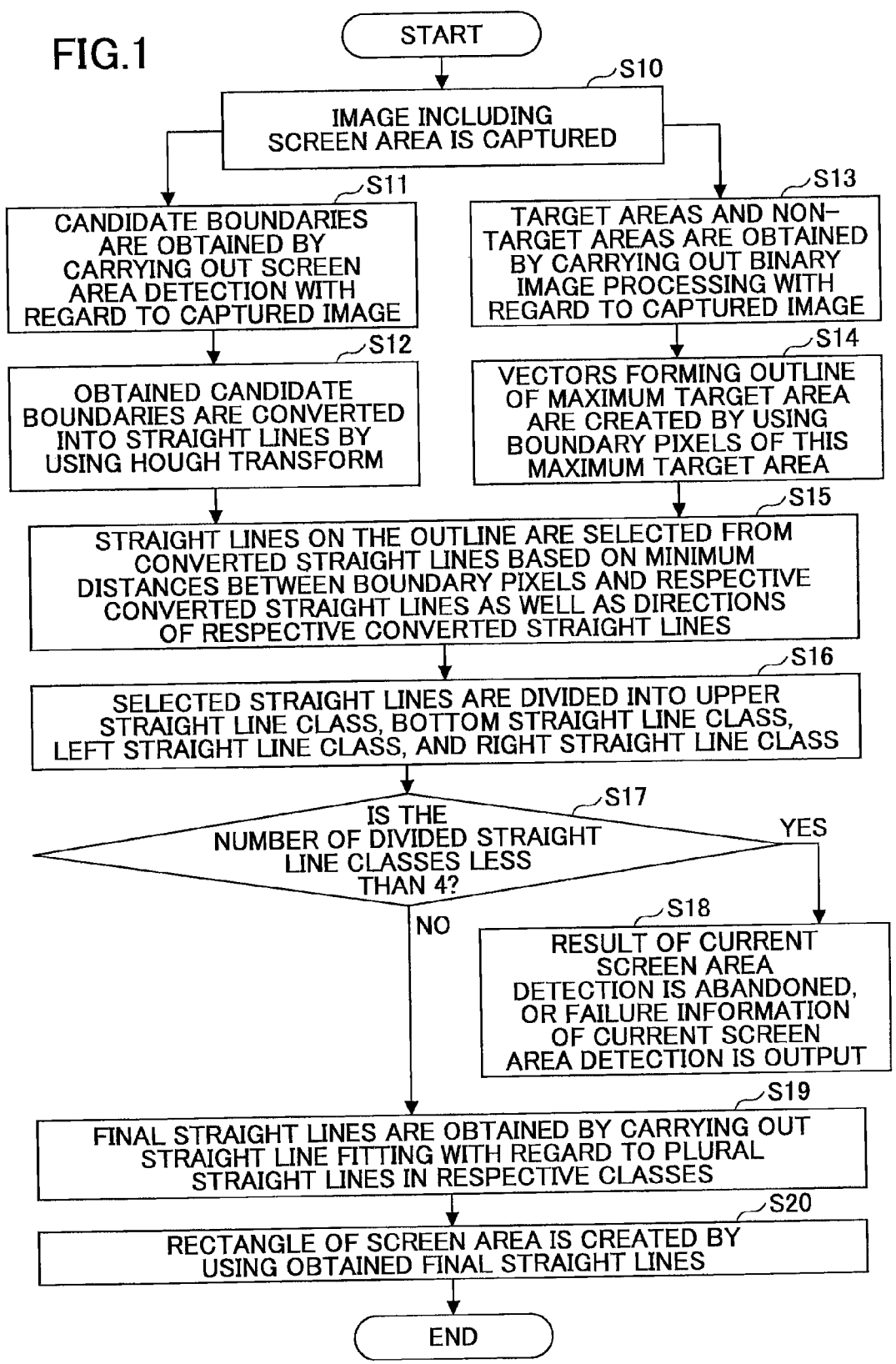
FIG. 1 is a flowchart of a screen area detection method according to an embodiment of the present invention.

FIG. 1 is a flowchart of a screen area detection method according to an embodiment of the present invention.

Figure 2:
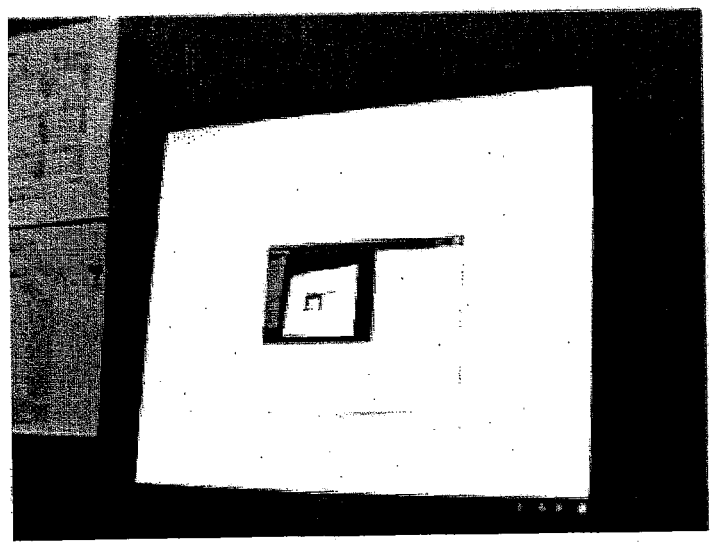
FIG. 2 is an example of a captured original image including a screen area.
Figure 5:
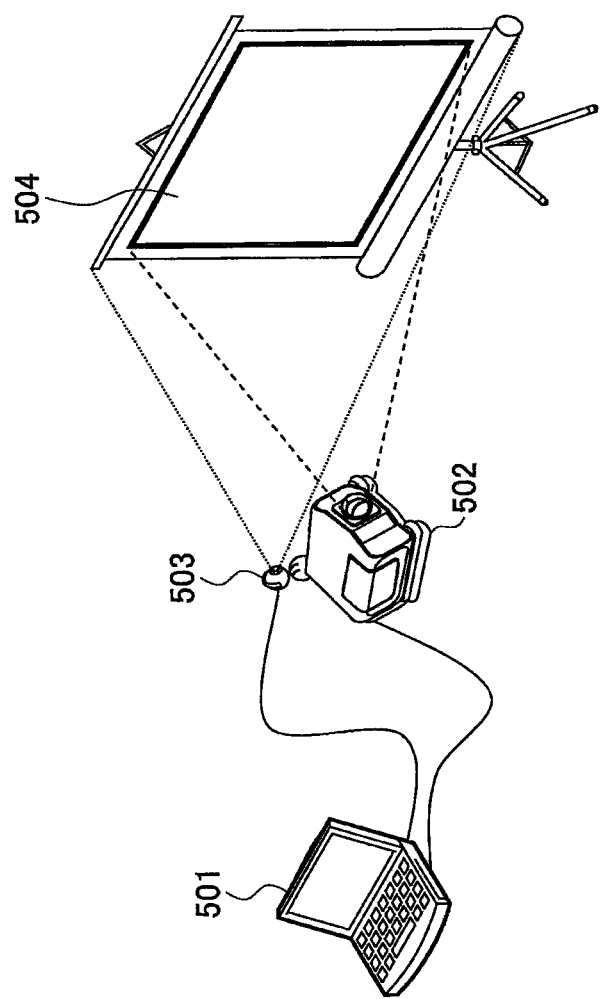
FIG. 5 illustrates a system adopting a screen area detection method according to an embodiment of the present invention.

As shown in FIG. 1, first, in STEP S10, an image capture device captures an image (i.e. a frame) including a screen area as shown in FIG. 2, and outputs the captured image to a computer such as a computer 501 shown in FIG. 5 so as to carry out follow-on processing. This kind of image capture device may be a camera 503 as shown in FIG. 5. An image shown in FIG. 2 is a 256-level grayscale image including a computer screen. However, this is only an example; it is possible to determine gray levels of an image based on actual needs. In the same way, if the camera 503 shown in FIG. 5 is adopted to capture an image, then a screen in the captured image is not a computer screen but a projector screen 504. In actual applications, a screen area in a captured image covers an area more than a half of the area of the captured image.

Next, in STEP S11 of FIG. 1, the computer carries out boundary (or edge) detection with regard to the image output from the image capture device; that is, plural candidate boundaries of the screen area in the captured image are obtained. As for the boundary detection, currently there are many known methods in the art; these methods are mainly divided into those based on retrieval and those based on zero intersection. The so-called boundary detection method based on retrieval is first calculating boundary strength which is expressed by a first derivative such as a gradient module in general, second estimating a local direction of a boundary by utilizing a gradient direction, and then seeking a maximum local gradient module by utilizing the local direction. The so-called boundary detection based on zero intersection is determining a boundary by seeking a zero intersection point of a second derivative obtained from an image; in general, a zero intersection point of a Laplacian operator or a non-linear differential equation is used.

A boundary detection method in an embodiment according to the present invention is the boundary detection method based on retrieval. The boundary detection method based on retrieval is briefly described as follows.

First a first derivative is calculated. Many boundary detection operations are based on the first derivative of brightness; in this way, brightness gradients of respective pixels (or pixel points) in a captured image are obtained. By using the obtained brightness gradients, it is possible to seek a peak value from the brightness gradients of the respective pixels in the captured image. If I(x) refers to the brightness of a pixel x, and I'(x) refers to the first derivative (i.e. the brightness gradient) of the pixel x, then the following equation (1) may be obtained.

$$I'(x) = -\tfrac{1}{2} \cdot I(x-1) + 0 \cdot I(x) + \tfrac{1}{2} \cdot I(x+1) \quad (1)$$

As for higher-performance image processing, the first derivative can be calculated by carrying out a convolution of original data (one dimension) having masks.

Second a threshold value is determined. As long as the first derivative of brightness is calculated, the next step is giving a threshold value so as to determine where a boundary is.

In the boundary detection method based on retrieval, adopted boundary detection operators include Roberts Cross operator, Prewitt operator, Sobel operator, and Canny operator. Currently the Canny operator (or a modification of this operator) is the most common boundary detection approach. In a boundary detection method adopting the Canny operator, an optimized pre-smoothing filter for boundary detection is utilized; this filter may be well optimized by a first Gaussian derivative kernel. In addition, in the boundary detection method adopting the Canny operator, a non-maximum suppression concept is introduced so that the boundary is defined as pixels having maximum gradient values along a gradient direction. Furthermore, in the boundary detection method adopting the Canny operator, two threshold values are used; the flexibility of two threshold values is better than that of one threshold value. In general, the lower a threshold value is, the more boundaries there are that are able to be detected; as a result, the detected result is more easily influenced by noise in an image, and non-relevant properties are more easily picked up from the image. On the contrary, a too high threshold value may cause loss of a relatively thin or short boundary.

In what follows, boundary detection performed based on brightness values of respective pixels in a captured image is described. That is, one or more candidate boundaries of a screen area are obtained according to variation of the brightness values of the respective pixels in the captured image.

Currently, in the field of computer image processing, the aim of boundary detection is detecting a feature of an abrupt change of light and dark in an image. In the image as shown in FIG. 2, a feature of an abrupt change of light and dark corresponds to a variation feature of the screen area brightness and the surrounding area brightness. The reason is that the brightness of the screen area is usually higher than that of the surrounding area.

In a boundary detection method according to an embodiment of the present invention, the above described Canny edge detection algorithm is adopted. The reason is that the Canny edge detection algorithm is a multi-stage detection algorithm able to detect boundary information in a wider area during image processing so as to be able to adapt to various usage environments more easily during test processing. This boundary detection method includes the following steps.

First noise is removed. The Canny edge detection algorithm uses a Gaussian smoothing filter to remove the noise in general. By using a Gaussian template to carry out a convolution calculation with regard to an original image, the noise in the original image is smoothed. The Gaussian template may be the following equation (2).

$$B = \frac{1}{159} \begin{bmatrix} 2 & 4 & 5 & 4 & 2 \\ 4 & 9 & 12 & 9 & 4 \\ 5 & 12 & 15 & 12 & 5 \\ 4 & 9 & 12 & 9 & 4 \\ 2 & 4 & 5 & 4 & 2 \end{bmatrix} * A \quad (2)$$

Here A refers to the original image, and B refers to the smoothed image.

Second brightness gradients and their directions are calculated. Boundaries in the smoothed image may have various directions; as a result, the Canny edge detection algorithm uses four templates to detect pixels forming the boundaries along a horizontal direction, a vertical direction, and diagonal directions in the smoothed image. By using an edge detection operator (for example, Roberts operator, Prewitt operator, or Sobel operator), horizontal brightness gradients ($G_y$) and vertical brightness gradients ($G_x$) of respective pixels in the smoothed image are calculated, and then brightness gradients (G) and brightness gradient directions (θ) of the respective pixels in the smoothed image are calculated by using the following equations (3) and (4).

$$G = \sqrt{G_x^2 + G_y^2} \quad (3)$$

$$\theta = \tan^{-1}\left(\frac{G_y}{G_x}\right) \quad (4)$$

Third the boundaries in the smoothed image are traced. Pixels having relatively high brightness gradients very possibly belong to the boundaries; however, since there is not an accurate value by which the pixels having relatively high brightness gradients may be determined as belonging to the boundaries, the Canny edge detection algorithm uses a lagging threshold value. The lagging threshold value needs two threshold values: a high threshold value (T1) and a low threshold value (T2). If it is supposed that the important boundaries in the smoothed image are continuous curves, then it is possible to trace the unclear parts of given curves, and avoid letting pixels which do not form the given curves be the boundaries. As a result, by using a relatively high threshold value, relatively reliably real boundaries may be determined, and by using the above obtained direction information, all of the boundaries in the smoothed image may be traced based on the relatively reliably real boundaries. When carrying out the boundary tracing, a relatively low threshold value is used; in this way, it is possible to trace the unclear parts of the given curves until reaching a start point (i.e. pixel). As long as this processing ends, a binary image may be obtained; each pixel in the obtained binary image indicates whether it is a boundary pixel.

An automatic threshold value calculation method is utilized in an embodiment of the present invention in order to cause the boundary detection method to be able to automatically adapt to various environments. The automatic threshold value calculation method is as follows.

First an average brightness value $L_{Avg}$ of respective pixels of a captured image is calculated by using the following equation (4).

$$L_{Avg} = \frac{\sum L_{x,y}}{N} \quad (4)$$

Here $L_{x,y}$ refers to a brightness value of a pixel located at (x, y), and N refers to the number of the pixels in the captured image.

Second, based on the average brightness value $L_{Avg}$, the pixels in the captured image are divided into two classes: pixels ($P_h$) whose brightness values are greater than the average brightness value $L_{Avg}$, and pixels ($P_l$) whose brightness values are less than the brightness value $L_{Avg}$.

Third, with regard to the two classes of pixels, respective average brightness values $Lh_{Avg}$ and $Ll_{Avg}$ of them are calculated by using the above equation (4). Then two threshold values T1 and T2 are calculated by using the following equations (5) and (6).

$$T1 = Lh_{Avg} - Ll_{Avg} \quad (5)$$

$$T2 = T1 \times 0.8 \quad (6)$$

According to the above description, candidate boundaries in the image shown in FIG. 2 may be detected. It is apparent that since the Canny edge detection algorithm uses the two threshold values T1 and T2, by adjusting the two threshold values when capturing the image in an actual application, it is possible to detect more boundaries of the screen area, and remove more other boundaries at the same time. According to the embodiment of the present invention, since these two threshold values T1 and T2 are based on the average brightness value $L_{Avg}$ of all of the pixels in the captured image, and are able to be obtained by an automatic calculation method, the efficiency of the boundary detection can be improved.

Figure 3A:
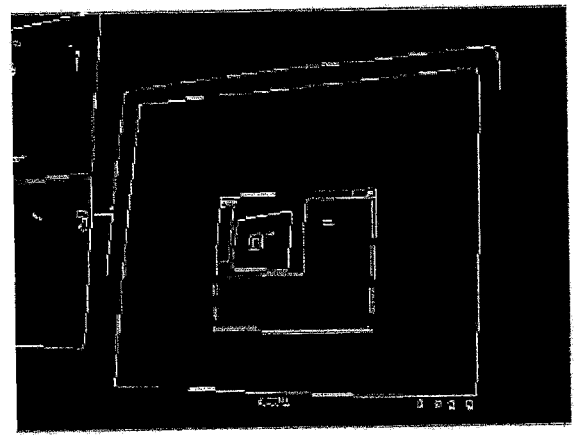
FIG. 3A is an example of an image obtained by carrying out screen area boundary detection with regard to the original image shown in FIG. 2.

Next, in STEP S12 of FIG. 1, the computer carries out straight line conversion with regard to the obtained candidate boundaries in an image (for example, an image shown in FIG. 3A) obtained after STEP S11 of FIG. 1; by using a Hough transform, the obtained candidate boundaries are converted into straight lines. The Hough transform is usually applied in the fields of image analyzing, computer vision, digital image processing, etc., and its aim is recognizing geometric shapes when carrying out image processing.

In an embodiment of the present invention, a simple and well-used Hough transform for recognizing straight lines in an image is utilized; that is, straight line detection is carried out according to a Hough transform algorithm based on probability by using an existing function HoughLinesP in OpenCV. In the HoughLinesP function, there are five parameters: degree of precision of distance (Rho) related to a pixel, degree of precision of angle (Theta) for measuring degree of arc, a threshold parameter (Threshold), a minimum line segment length value (minLineLength), and a maximum gap value (maxLineGap) when connecting a group of breaking line segments on the same line. If a corresponding cumulative total value is greater than the threshold parameter Threshold, then the function HoughLinesP returns a current line segment. In an embodiment of the present invention, the above five parameters may be given the following corresponding values.

Rho=1
Theta=π/90
Threshold=20
minLineLength=20
maxLineGap=5

Here it should be noted that the above-mentioned values are only for reference; that is, concrete values of the five parameters depend on actual environments, for example, and may be influenced by the size of a captured image, the result of boundary detection, etc. As result, the concrete values of the five parameters may be adjusted according to actual circumstances.

When carrying out STEP S11 and STEP S12 of FIG. 1, in STEP S13 of FIG. 1, the computer carries out binary image processing with regard to the captured original image (for example, the image shown in FIG. 2) at the same time. Binary image processing is one of the basic issues of pixel division; its aim is dividing pixels in a given image into two classes: target pixels and background pixels. Thresholding is one of the most common methods for image division. Up to now, there have been various threshold selecting methods, such as Otsu's method, the maximum entropy method, etc., in which Otus's method is a simple and highly-efficient algorithm for converting a grayscale image into a binary image.

Figure 3B:
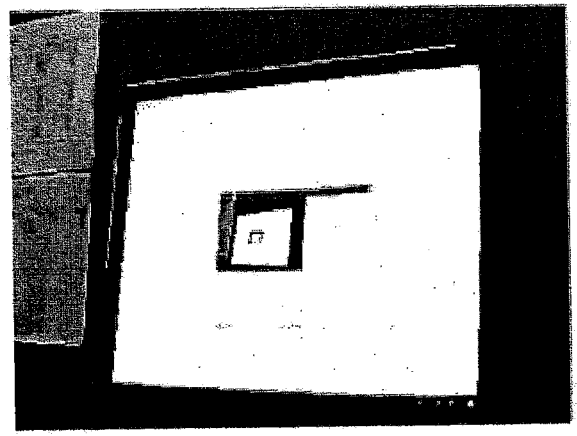
FIG. 3B is an example of an image obtained by carrying out straight line conversion with regard to the image shown in FIG. 3A.
Figure 3C:
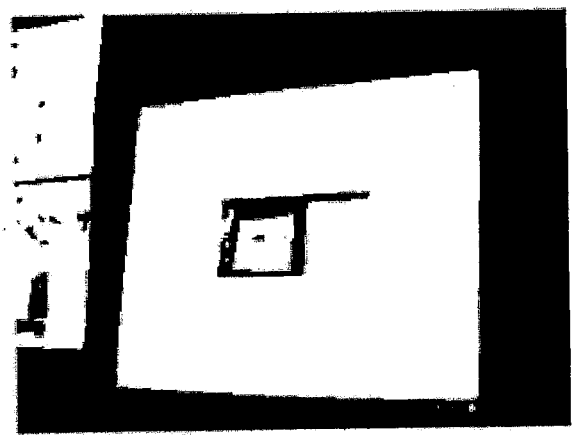
FIG. 3C is an example of an image obtained by carrying out binary image processing with regard to the original image shown in FIG. 2.
Figure 3D:
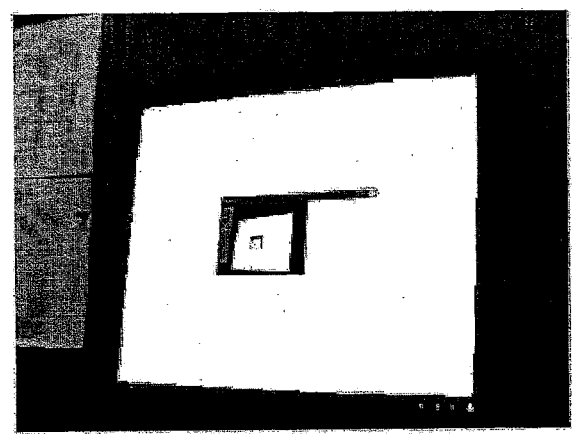
FIG. 3D is an example of an image obtained by carrying out screen area boundary determination with regard to the image shown in FIG. 3C.

In general, since the brightness of a screen area is higher than that of a non-screen area, and the screen area is greater than or equal to half of the area of the whole image, it is possible to directly use the average brightness value $L_{Avg}$ calculated in STEP S11 of FIG. 1 to serve as a threshold value for binary image processing. In particular, first the average brightness value $L_{Avg}$ of all pixels in a captured image is calculated; then binary image processing is carried out with regard to the captured image by letting the calculated average brightness value be a threshold value, i.e., pixels whose brightness values are greater than the average brightness value $L_{Avg}$ are set to white color, and other pixels are set to black color. In a case of the screen area detection according to an embodiment of the present invention, the aim of binary image processing is roughly dividing pixels in a captured image into a screen area (white color) and a non-screen area (black color) based on brightness features of the respective pixels in the captured image so as to obtain an image as shown in FIG. 3C. Setting of a threshold value for binary image processing is very important in this step. Since the threshold value for binary image processing in the embodiment of the present invention can be determined based on actual circumstances of the image, the effect of the screen area detection method according to the embodiment of the present invention can be improved.

Here it should be noted that although Otsu's method is adopted for carrying out the binary image processing in the above described embodiments, the binary image processing may also be carried out by using other methods, for example, the maximum entropy method. That is, the present invention is not limited to Otsu's method when carrying out the binary image processing.

Next, in STEP S14 of FIG. 1, the computer obtains boundary pixels of a maximum connecting white area formed of the pixels that are set to white color, and lets the boundary pixels of the maximum connecting white area be the outline of the connecting white area. That is, the maximum connecting white area in the binary image obtained in STEP S13 of FIG. 1 is detected, and vectoring is carried out with regard to the maximum connecting white area by using the boundary pixels of the maximum connecting white area to create vectors forming the outline of the maximum connecting white area.

In an embodiment of the present invention, the outline of the maximum connecting white area in the binary image is detected by a function cvFindContours in OpenCV. As shown in FIG. 3C, since there may be plural connecting white areas in the binary image, plural outlines may be detected by the outline detection. Since a screen area is a maximum area in an image in general, it is possible to choose the outline of the maximum area to serve as the outline of the screen area.

Next, in STEP S15 of FIG. 1, straight lines on the outline of the screen area are selected from the converted straight lines based on minimum distances between the boundary pixels and the respective converted straight lines as well as directions of the respective converted straight lines. In particular, it is determined which straight lines in those straight lines in FIG. 3B belong to the outline of the screen area.

Figure 4:
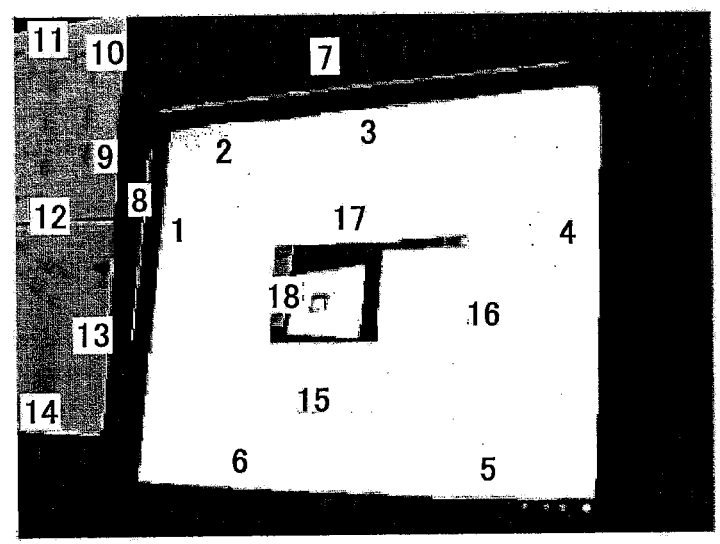
FIG. 4 is an example of an image obtained by carrying out annotation processing with regard to straight lines in the image shown in FIG. 3B.

Since there is noise interference in STEP S11 and STEP S12 of FIG. 1, some of the converted straight lines are not relevant to the outline of the screen area; these kinds of non-relevant straight lines are called interference straight lines. As a result, the processing performed in STEP S15 is removing these kinds of interference straight lines so as to reduce the error of the screen area detection. As shown in FIG. 4, some of the straight lines obtained after the processing of STEP S12 are not relevant to the screen area, for example, straight lines 7~18 in FIG. 4, and these kinds of non-relevant straight lines are also not on the outline of the screen area. In an embodiment of the present invention, whether the straight lines obtained after the processing of STEP S12 belong to the outline of the screen area is determined by calculating positional relationships of the respective straight lines and the outline of the screen area as well as directions of the corresponding straight lines.

First a straight line is arbitrarily selected, and a minimum distance between the straight line and the outline of the screen area is calculated. In particular, as described above, the outline of the screen area is expressed by the vectors formed of the pixels on the outline of the screen area; as a result, when calculating the minimum distance between the straight line and the outline of the screen area, it is necessary to calculate distances between the respective pixels on the outline of the screen area and the straight line, and then select a minimum value from the distances to serve as the minimum distance between the straight line and the outline of the screen area. By setting a distance threshold value, all of the above-mentioned straight lines may be divided into two classes: screen area boundary straight lines and interference straight lines. The distance threshold value depends on the size of the captured image and a ratio of the screen area to the whole image area. In an embodiment of the present invention, the size of a captured image (for example, as shown in FIG. 2) is 320*240, and a screen area covers 60% or more of the whole image area; in this case, the distance threshold value may be set to a distance of 5, 6, 7, 8, 9, or 10 pixels. If the distance threshold value is set to the distance of 6 pixels, then straight lines whose minimum distances are greater than the distance of 6 pixels are determined as the interference straight lines; otherwise straight lines are determined as screen area boundary straight lines. In a case as shown in FIG. 4, straight lines 1~8 are determined as the screen area boundary straight lines, and straight liens 9~18 are determined as interference straight lines.

Second, by calculating directions of the straight lines, it is further determined which straight lines belong to the screen area boundary straight lines and which straight lines belong to the interference straight lines. In particular, the direction of each straight line and the direction of a pixel on the outline, closest to this straight line are calculated, and then a difference of the two directions (i.e. an angle between the two directions) is calculated; if the difference of the two directions is less than or equal to a predetermined threshold value (for example, 30°, 35°, 40°, or 45°), then the straight line is considered as belonging to the screen area boundary straight lines; otherwise it is considered as belonging to the interference straight lines.

In an embodiment of the present invention, a direction of a straight line is obtained by calculating the brightness gradient of each pixel on the straight line according to a predetermined operator. The predetermined operator uses two 3×3 matrixes to make convolutions with pixels in an image; one of the matrixes is used for calculating a longitudinal brightness gradient, and another is used for calculating a lateral brightness gradient. If it is supposed that A refers to an original image, and $G_x$ and $G_y$ refer to a longitudinal brightness gradient and a lateral brightness gradient, respectively, then $G_x$ and $G_y$ may be calculated by using the following equations (7) and (8).

$$G_y = \begin{bmatrix} +1 & +2 & +1 \\ 0 & 0 & 0 \\ -1 & -2 & -1 \end{bmatrix} * A \tag{7}$$

$$G_x = \begin{bmatrix} +1 & 0 & -1 \\ +2 & 0 & -2 \\ +1 & 0 & -1 \end{bmatrix} * A \tag{8}$$

Here * refers to a two-dimensional convolution calculation.

By using the calculated $G_x$ and $G_y$, the direction of the straight line may be obtained by calculating an angle θ according to the following equation (9).

$$\theta = \sin^{-1}\left(\frac{G_x}{\sqrt{G_x^2 + G_y^2}}\right) \tag{9}$$

In the same way, it is possible to calculate directions of respective pixels on a screen area outline in the original image. By comparing the direction of the straight line and the direction of a pixel on the screen area outline closest to the straight line, it is possible to determine whether the straight line belongs to the screen area boundary straight lines. By carrying out this kind of comparison, for example, in FIG. 4, straight lines 7 and 8 are considered as belonging to the interference straight lines that are not located on the screen area outline, and straight lines 1-6 are considered as belonging to the screen area boundary straight lines that are located on the screen area outline.

Next, in STEP S16 of FIG. 1, based on positional relationships of the straight lines that are determined as belonging to the screen area boundary straight lines in STEP 15, the determined screen area boundary straight lines are divided into an upper boundary straight line class, a bottom boundary straight line class, a left boundary straight line class, and a right boundary straight line class. In other words, a screen area is a rectangle in general; as a result, based on the positional relationships of the determined screen area boundary straight lines, the determined screen area boundary straight lines are divided into four classes: upper boundary straight lines, bottom boundary straight lines, left boundary straight lines, and right boundary straight lines. In particular, as for a screen area outline, it is possible to calculate the maximum and minimum values of its lateral and longitudinal coordinates. As for the respective straight lines on the screen area outline, it is possible to utilize the calculated directions of them and their positions to divide them into the upper boundary straight lines, the bottom boundary straight lines, the left boundary straight lines, and the right boundary straight lines. Then the screen area detection processing goes to STEP S17 of FIG. 1.

In STEP S17 of FIG. 1, the computer determines whether the number of the classes of the divided straight lines is less than 4. If the number is less than 4, then the computer carries out an operation in STEP S18 to give up on the result of the current screen area detection processing (i.e. without any response to the operation of a user) or directly outputs a failure message. In an embodiment of the present invention, for example, in FIG. 4, straight lines 1~6 are divided as follows: the straight line 1 belongs to the left boundary straight lines, the straight lines 1 and 3 belong to the upper boundary straight lines, the straight line 4 belongs to the right boundary straight line, and the straight lines 5 and 6 belong to the bottom boundary straight lines.

In STEP S17, if the computer determines that the number of the classes of the divided straight lines is equal to 4, then a straight line is obtained in STEP S19 by carrying out straight line fitting with regard to plural straight lines in the same class; in this way, four boundaries of the screen area are obtained. In general, like the straight lines in FIG. 4, in each of the upper boundary straight line class, the bottom boundary straight line class, the left boundary straight line class, and the right boundary straight line class, there may be plural straight lines. In order to improve the accuracy of the screen area detection, it is possible to carry out the straight line fitting with regard to the plural straight lines in the same class; in this way, more accurate boundary lines of the screen area may be obtained. As for the straight line fitting, there are many conventional techniques that may be utilized in the embodiments of the present invention.

A well-used straight line fitting method is the least-squares straight line fitting.

If it is supposed that there are plural data points $(x_i, y_i)$ $(i=1, 2, \ldots, N)$, then when trying to obtain a straight line $y=a+bx$ by carrying out a straight line fitting with regard to the plural data points $(x_i, y_i)$, it is not necessary to let all of the data points $(x_i, y_i)$ be on the straight line (strictly speaking, it is impossible sometimes). That is, it is desirable that all of the data points $(x_i, y_i)$ approach the straight line as close as possible. For example, if $y_{li}=a+bx_i$ $(i=1, 2, \ldots, N)$ refers to appropriate values calculated according to the straight line $y=a+bx$, then differences $e_i=y_i-y_{li}$ are called errors. The errors are important flags by which the result of the straight line fitting may be determined good or bad. In general, there are three criteria as follows:

(i) making the maximum absolute value of the errors to be minimum: $\min(\max_i |e_i|)$;

(ii) making the sum of the absolute values of the errors to be minimum: $\min \Sigma_i |e_i|$; and (iii) making the square sum of the errors to be minimum: $\min \Sigma_i e_i^2$.

The straight line fitting based on the criterion (iii) is called the least-squares straight line fitting that may be expressed as solving the following equation (10).

$$\begin{cases} aN + b\sum x_i = \sum y_i \\ a\sum x_i + b\sum x_i^2 = \sum x_i y_i \end{cases} \tag{10}$$

In addition, in an embodiment of the present invention, it is also possible to extract ends of the respective straight lines in the same class, then calculate appropriate straight lines by using all of the ends, and then let the appropriate straight lines be final boundaries of the screen area.

Last, in STEP S20 of FIG. 1, a rectangle of the screen area is created by using the four straight lines obtained in STEP S19.

According to the above described screen area detection method in the embodiments of the present invention, in a computer-human interaction virtual whiteboard system, it is possible to carry out automatic and real-time screen area detection; as a result, the screen area detection method according to the embodiments of the present invention has strong robustness with regard to various application conditions. Therefore user experience of the system may be dramatically improved.

FIG. 5 illustrates a system adopting the screen area detection method according to the embodiments of the present invention. The system comprises a computer 501, a projector 502, a camera 503, and a projector screen 504. The computer 501 runs application programs, and outputs contents to the projector 502. The projector 502 projects the contents on the projector screen 504. The camera 503 captures an image including the projector screen 54 according to a predetermined rule, and sends the captured image to the computer 501. After the computer 501 receives the captured image, it carries out the above STEPS S11~S20 to perform screen area detection so as to accurately obtain a screen area in the capture image.

FIG. 6 is a block diagram of a screen area detection system 600. The screen area detection system 600 comprises an image capture unit 601 used to capture an image including a screen area; a boundary detection unit 602 used to obtain plural candidate boundaries of the screen area based on variation of brightness values of respective pixels in the captured image; a straight line conversion unit 603 used to convert the obtained candidate boundaries into straight lines by using the Hough transform; and a binary image processing unit 604 used to carry out binary image processing with regard to the captured image. The captured image is divided into one or more target areas and one or more non-target areas, in particular, to carry out binary image processing with regard to the captured image based on an average brightness value of brightness values of the respective pixels in the captured image. Pixels whose brightness values are greater than the average brightness value are set to white color, and other pixels are set to black color; an outline extraction unit 605 is used to obtain boundary pixels of a maximum connecting white area formed of the pixels that are set to white color, and lets the boundary pixels serve as an outline of the corresponding connecting white area; an outline straight line selection unit 606 is used to select straight lines located on the outline from the converted straight lines based on minimum distances between the boundary pixels and the respective converted straight lines as well as directions of the respective converted straight lines; a straight line classification unit 607 is used to divide the selected straight lines into an upper boundary straight line class, a bottom boundary straight line class, a left boundary straight line class, and a right boundary straight line class based on positional relationships of the selected straight lines; a number-of-classes determination unit 608 is used to determine whether the number of the divided straight line classes is 4; a failure information output unit 609 used to output failure information of screen area detection when the number-of-classes determination unit 608 determines that the number of the divided straight line classes is less than 4; a straight line fitting unit 610 is used to obtain four final boundary straight lines by carrying out straight line fitting with regard to plural straight lines in the respective classes so as to obtain four boundaries of the screen area; and a screen area creation unit 611 is used to create the screen area by using the four final boundary straight lines.

While the present invention is described with reference to the specific embodiments chosen for purpose of illustration, it should be apparent that the present invention is not limited to these embodiments, but numerous modifications could be made thereto by those skilled in the art without departing from the basic concept and scope of the present invention.

The present application is based on Chinese Priority Patent Application No. 201010165224.X filed on May 7, 2010, the entire contents of which are hereby incorporated by reference.

What is claimed is:

1. A screen area detection method comprising:
   a step of capturing an image including a screen area;
   a step of obtaining plural candidate boundaries of the screen area based on variation of brightness values of respective pixels in the captured image;
   a step of converting the obtained candidate boundaries into straight lines by using a Hough transform;
   a step of carrying out binary image processing with regard to the captured image, wherein, the captured image is divided into one or more target areas and one or more non-target areas;
   a step of obtaining boundary pixels of a maximum target area in the target areas, and letting the boundary pixels serve as an outline of the maximum target area;
   a step of selecting straight lines located on the outline from the converted straight lines based on minimum distances between the boundary pixels and the respective converted straight lines as well as directions of the respective converted straight lines;
   a step of dividing the selected straight lines into an upper boundary straight line class, a bottom boundary straight line class, a left boundary straight line class, and a right boundary straight line class based on positional relationships of the selected straight lines; and
   a step of obtaining final straight lines by carrying out straight line fitting with regard to plural straight lines in the respective classes so as to obtain four boundaries of the screen area.

2. The screen area detection method according to claim 1, wherein: the candidate boundaries of the screen area are obtained by using a Canny, Sobel, or Harris edge detection algorithm.

3. The screen area detection method according to claim 1, wherein: the step of selecting straight lines on the outline from the converted straight lines includes: a step of calculating distances between the respective boundary pixels and a corresponding converted straight line, and selecting a minimum value from the calculated distances to serve as a minimum distance between the corresponding converted straight line and the outline; and a step of comparing the obtained minimum distance and a predetermined distance threshold value, and letting the corresponding converted straight line be one of the straight lines on the outline if the minimum distance is less than the predetermined distance threshold value.

4. The screen area detection method according to claim 1, wherein: the step of selecting straight lines on the outline from the converted straight lines includes: a step of calculating a direction of a corresponding converted straight line based on lateral brightness gradients and longitudinal brightness gradients of respective pixels on the corresponding converted straight line; a step of calculating a boundary pixel closest to the corresponding converted straight line, and calculating a direction of the boundary pixel based on a lateral brightness gradient and a longitudinal brightness gradient of the boundary pixel; and a step of comparing the direction of the corresponding converted straight line and the direction of the boundary pixel, and letting the corresponding converted straight line be one of the straight lines on the outline if an angle between the two directions is less than a predetermined angle threshold value.

5. The screen area detection method according to claim 3, wherein: the predetermined distance threshold value is a distance of 5, 6, 7, 8, 9, or 10 pixels.

6. The screen area detection method according to claim 4, wherein: the predetermined angle threshold value is 20, 30, 40, or 45 degrees.

7. A screen area detection system comprising:
   computer including:
   an image capture unit used to capture an image including a screen area;
   a boundary detection unit used to obtain plural candidate boundaries of the screen area based on variation of brightness values of respective pixels in the captured image;
   a straight line conversion unit used to convert the obtained candidate boundaries into straight lines by using a Hough transform;
   a binary image processing unit used to carry out binary image processing with regard to the captured image, wherein, the captured image is divided into one or more target areas and one or more non-target areas;
   an outline extraction unit used to extract plural boundary pixels of a maximum target area in the target areas, and let the boundary pixels serve as an outline of the maximum target area;

a straight line selection unit used to select straight lines located on the outline from the converted straight lines based on minimum distances between the boundary pixels and the respective converted straight lines as well as directions of the respective converted straight lines;

a straight line classification unit used to divide the selected straight lines located on the outline into an upper boundary straight line class, a bottom boundary straight line class, a left boundary straight line class, and a right boundary straight line class based on positional relationships of the selected straight lines; and a straight line fitting unit used to obtain final straight lines by carrying out straight line fitting with regard to plural straight lines in the respective classes so as to obtain four boundaries of the screen area.

8. The screen area detection system according to claim 7, wherein: the candidate boundaries of the screen area are obtained by using a Canny, Sobel, or Harris edge detection algorithm.

9. The screen area detection system according to claim 7, wherein: the straight line selection unit includes: a distance calculation unit used to calculate distances between the respective boundary pixels and a corresponding converted straight line, and select a minimum value from the calculated distances to serve as a minimum distance between the corresponding converted straight line and the outline; and a distance comparison unit used to compare the obtained minimum distance and a predetermined distance threshold value, and let the corresponding converted straight line be one of the straight lines located on the outline if the minimum distance is less than the predetermined distance threshold value.

10. The screen area detection system according to claim 7, wherein: the straight line selection unit includes: a direction calculation unit used to calculate a direction of a corresponding converted straight line based on lateral brightness gradients and longitudinal brightness gradients of respective pixels on the corresponding converted straight line, and calculate, by calculating a boundary pixel closest to the corresponding converted straight line, a direction of the boundary pixel based on a lateral brightness gradient and a longitudinal brightness gradient of the boundary pixel; and a comparison unit used to compare the direction of the corresponding converted straight line and the direction of the boundary pixel, and let the corresponding converted straight line be one of the straight lines located on the outline if an angle between the two directions is less than a predetermined angle threshold value.

* * * * *